US008672595B2

(12) United States Patent
Goettlich

(10) Patent No.: US 8,672,595 B2
(45) Date of Patent: Mar. 18, 2014

(54) EXPANSION ANCHOR AND METHOD FOR THE PREFERABLY SURFACE-NEAR ANCHORING IN AN ANCHORING BASE

(75) Inventor: Jutta Goettlich, Wedemark (DE)

(73) Assignee: Eugen Schnarr, Grossostheim (DE)

( * ) Notice: Subject to any disclaimer, the term of this patent is extended or adjusted under 35 U.S.C. 154(b) by 216 days.

(21) Appl. No.: 12/452,460

(22) PCT Filed: Jun. 25, 2008

(86) PCT No.: PCT/DE2008/001046
§ 371 (c)(1),
(2), (4) Date: Dec. 31, 2009

(87) PCT Pub. No.: WO2009/003447
PCT Pub. Date: Jan. 8, 2009

(65) Prior Publication Data
US 2010/0129172 A1 May 27, 2010

(30) Foreign Application Priority Data
Jul. 2, 2007 (DE) .......................... 10 2007 030 737

(51) Int. Cl.
F16B 13/06 (2006.01)

(52) U.S. Cl.
USPC ........................................ 411/57.1; 411/80.5

(58) Field of Classification Search
USPC ........................ 411/57.1, 60.1, 60.2, 72, 80.6
See application file for complete search history.

(56) References Cited

U.S. PATENT DOCUMENTS

| 1,000,715 | A | * | 8/1911 | Caywood | 411/57.1 |
| 2,033,100 | A | * | 3/1936 | Kellogg | 52/242 |
| 2,370,327 | A | * | 2/1945 | Rosan | 411/80.2 |
| 2,470,924 | A | * | 5/1949 | Flogaus | 411/80.6 |
| 3,516,324 | A | * | 6/1970 | Berner | 411/72 |
| 3,874,264 | A | * | 4/1975 | Polos | 411/80.6 |
| 4,478,545 | A | * | 10/1984 | Mizusawa et al. | 411/80.1 |
| 5,692,864 | A | * | 12/1997 | Powell et al. | 411/30 |
| 5,746,557 | A | * | 5/1998 | Kaibach | 411/54.1 |
| 5,993,129 | A | * | 11/1999 | Sato | 411/80.6 |
| 2005/0169726 | A1 | * | 8/2005 | McClure | 411/55 |

FOREIGN PATENT DOCUMENTS

| DE | 19 06 206 | 12/1964 |
| DE | 80 22 962 | 1/1985 |
| EP | 0 216 233 | 4/1987 |
| FR | 2 130 091 | 11/1972 |

OTHER PUBLICATIONS

International Search Report.

* cited by examiner

Primary Examiner — Gary Estremsky
(74) Attorney, Agent, or Firm — Collard & Roe, P.C.

(57) ABSTRACT

The invention relates to an expansion anchor (10) comprising an expansion sleeve (12) which is divided into expansions (18) by means of longitudinal slots (14) arranged in the front section in the direction of placement (16) of the expansion sleeve (12) and also has an inner thread (20) in the rear section in the direction of placement (16). The expansion anchor (10) further comprises an expansion body (22), which preferably has the shape of a cone stump that tapers conically in the direction of placement (18), the conical stump being arranged in the front section in the direction of placement (16) of the expansion sleeve and inside the expansion sleeve (12).

9 Claims, 3 Drawing Sheets

Figure 1:
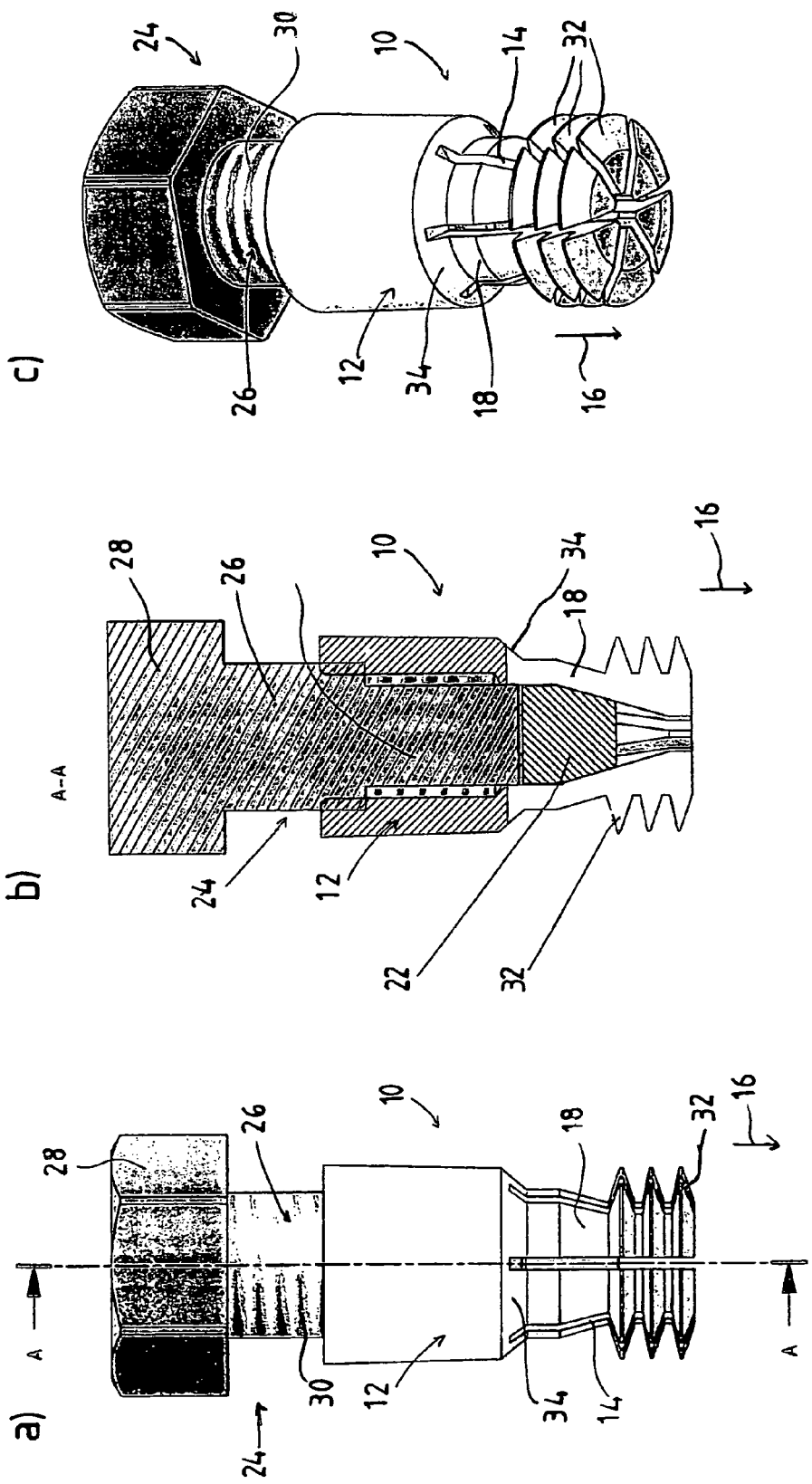

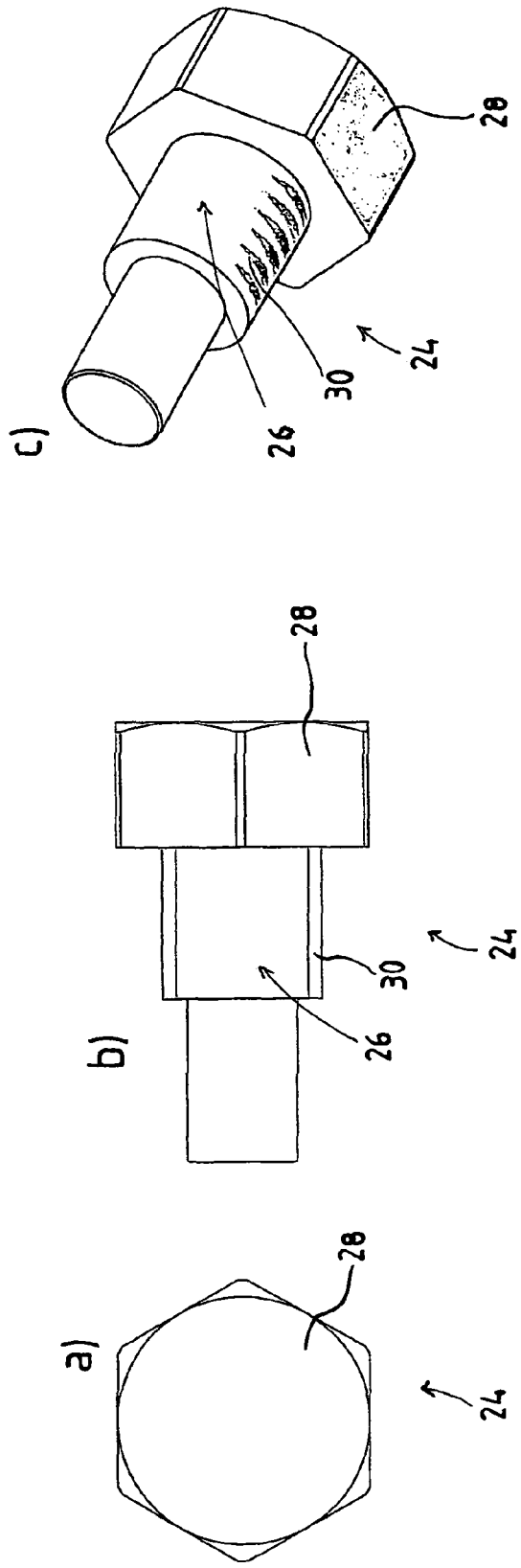
FIG. 3
FIG. 4

EXPANSION ANCHOR AND METHOD FOR THE PREFERABLY SURFACE-NEAR ANCHORING IN AN ANCHORING BASE

CROSS REFERENCE TO RELATED APPLICATIONS

This application is the National Stage of PCT/DE2008/001046 filed on Jun. 25, 2008, which claims priority under 35 U.S.C. §119 of German Application No. 10 2007 030 737.5 filed on Jul. 2, 2007. The international application under PCT article 21(2) was not published in English.

The invention relates to an expansion anchor as well as to a method for preferably surface-near anchoring of the expansion anchor in an anchoring base.

In the sector of construction technology, the task frequently occurs of introducing loads into components such as concrete or steel-reinforced concrete. For this purpose, various fastening means are known, which can be classified according to their mechanism and the method of force transfer. For anchoring in safety-relevant regions, fastening means are generally inserted at relatively great setting depths of 90 mm and more, in other words no longer near the surface, and anchored in the anchoring base. Depending on the composition of the anchoring base, difficulties can occur when producing the deep accommodation bores required for this.

It is therefore the task of the present invention to create an expansion anchor that can be anchored in the anchoring base, preferably in surface-near manner, without great effort, whereby the expansion anchor can also be used in safety-relevant regions, and allows anchoring with sufficiently great holding values. Furthermore, the invention is based on the task of making available a method for rapid setting of the expansion anchor in the preferably surface-near anchoring base, in such a manner that a component or the like can be fastened to the expansion anchor, immediately after setting, in other words without any waiting time.

This task is accomplished by means of an expansion anchor according to one aspect of the invention, and by means of a method according to another aspect of the invention. Advantageous embodiments and further developments of the invention are discussed below.

The solution according to the invention provides an expansion anchor composed of an expansion sleeve and an expansion body, whereby the expansion sleeve is divided into expansion tongues by means of longitudinal slits that are disposed in the front region of the expansion sleeve, in the setting direction, and has an inner thread in the rear region, in the setting direction, and whereby the expansion body, preferably in the form of a truncated cone that narrows conically in the setting direction, is disposed in the front region of the expansion sleeve, within the expansion sleeve, in the setting direction.

Such an expansion anchor can be anchored in the anchoring base, without great effort, preferably close to the surface, whereby the expansion anchor can also be used in safety-relevant regions and allows anchoring with sufficiently great holding values.

A further development of the invention provides that the expansion anchor can be inserted, preferably hammer-driven into a predetermined bore of an anchoring base, with a low setting depth. The setting depth amounts to less than 90 mm, preferably less than 80 mm, furthermore preferably less than 70 mm, furthermore preferably less than 60 mm, furthermore preferably less than 50 mm.

An advantageous embodiment of the invention provides that the expansion sleeve can be expanded by means of a screw composed of a screw shaft and a screw head, which screw is configured preferably without a thread in the front region of the screw shaft, in the setting direction, and with an outside thread that matches the inside thread of the expansion sleeve in the rear region, in such a manner that when the screw is screwed into the expansion sleeve and subsequently tightened, the expansion body is pressed forward, in the setting direction, so that the expansion sleeve expands.

Preferably, the thread-free part of the screw shaft is smaller in diameter than the part of the screw shaft provided with the outside thread.

It is practical if the length of the screw, i.e. of the screw shaft is predetermined in defined manner and adapted to the expansion sleeve used and to the expansion body disposed on the expansion sleeve, preferably in such a manner that defined expansion takes place.

A further development of the invention provides that the expansion body consists of plastic or metal, preferably of steel.

Furthermore, it is provided that the expansion tongues have at least one, preferably multiple cutting edges disposed one behind the other, particularly preferably three cutting edges disposed one behind the other, on the outside of their free ends.

An advantageous embodiment of the invention provides that the expansion tongues are configured in such a manner that when the expansion body is pressed into the expansion sleeve, they are expanded outward, and when the expansion body is pressed further in, they pivot out in accordance with the conicity of the expansion body, to such an extent that the cutting edges cut into the wall of the bore in the anchoring base and then form an undercut in the bore in this region.

Preferably, the transition between the region of the expansion sleeve that is not divided into expansion tongues and the expansion tongue is configured in one step for forming a planned bending point, whereby the incline is preferably structured in the form of a slanted plane.

It is practical if the expansion anchor is a metal expansion anchor, preferably an undercut anchor.

Preferably, the expansion anchor can be set into concrete and steel-reinforced concrete components, preferably in ceilings.

In the method according to the invention, for surface-near anchoring of the expansion anchor according to the invention into an anchoring base, the expansion sleeve is inserted into a predetermined bore of the anchoring base that preferably has a low setting depth, preferably hammer-driven in, and subsequently expanded in the anchoring base so as to anchor it, in that the expansion body is pressed forward, in the setting direction, in other words deeper into the expansion sleeve.

An advantageous embodiment of the invention provides that the expansion sleeve is expanded by means of a screw composed of a screw shaft and a screw head, which screw is configured preferably without a thread in the front region of the screw shaft, in the setting direction, and with an outside thread that matches the inside thread of the expansion sleeve in the rear region, in such a manner that when the screw is screwed into the expansion sleeve and subsequently tightened, the expansion body is pressed forward, in the setting direction, so that the expansion sleeve expands.

It is practical if the screw is unscrewed from the expansion sleeve, which is then anchored, after the expansion sleeve has been expanded, so that the anchored expansion sleeve is available for further use, preferably for fastening components, whereby corresponding fastening means are screwed into the expansion sleeve, preferably for fastening the components.

the following, the invention will be explained using an exemplary embodiment that is shown in the drawing. The drawing shows, in:

FIG. 1 the expansion anchor according to the invention, with the screw partially screwed in, in a) a side view, in b) a view in longitudinal section, and in c) a perspective representation, FIG. 2 the expansion sleeve of the expansion anchor according to the invention, in a) the viewing direction from above, in b) a side view, in c) the viewing direction from below, in d) a view in longitudinal section, in e) a perspective representation in the viewing direction at a slant from the side, in f) a perspective representation in the viewing direction at a slant from above, and in g) as a detail of the cutting edges shown in d), FIG. 3 the expansion body of the expansion anchor according to the invention, in a) the viewing direction from above, in b) a side view, in c) perspective representation in the viewing direction at a slant from the side, and in d) a perspective representation in the viewing direction at a slant from the side, and FIG. 4 the screw for expanding the expansion anchor according to the invention in a) the viewing direction from above, in b) a side view, and in c) a perspective representation.

In all the figures, the same reference symbols refer to the same components.

In FIG. 1, the expansion anchor 10 according to the invention is shown with the screw 24 partially screwed in. The expansion anchor 10 consists of an expansion sleeve 12 and an expansion body 22. The expansion sleeve 12 is divided into expansion tongues 18 by means of longitudinal slits 14 that are disposed in the front region of the expansion sleeve 12, in the setting direction 16. The expansion sleeve 12 has an inner thread 20 in the rear section, in the setting direction 16. In the present case, the expansion body 22 is configured in the form of a truncated cone that narrows conically in the setting direction 16, and disposed within the expansion sleeve 12 in the front section of the expansion sleeve 12, in the setting direction 16.

The expansion sleeve 12 is expanded by means of a screw 24 composed of screw shaft 26 and screw head 28, which screw is configured without a thread in the front region of the screw shaft 26, in the setting direction 16, and with an outside thread 30 that matches the inside thread 20 of the expansion sleeve 12 in the rear region. For this purpose, the expansion body 22 is pressed forward, in the setting direction 16, by screwing this screw 24 into the expansion sleeve 12 and subsequently tightening it, so that the expansion sleeve 12 expands.

The expansion body 22 consists of steel.

The expansion tongues 18 have three cutting edges 32 disposed one behind the other on the outside of their free ends.

The expansion tongues 18 are configured in such a manner that these are expanded when the expansion body 22 is pressed into the expansion sleeve 12, and pivot out as the expansion body 22 is pressed further in, in accordance with the conicity of the expansion body 22, to such an extent that the cutting edges 32 cut into the wall of the bore in the anchoring base, not shown here, and then form an undercut in the bore in this region.

The transition between the region of the expansion sleeve 12 not divided into expansion tongues 18 and the expansion tongue 18 is configured in one step for forming a planned bending point, whereby the incline is preferably structured in the form of a slanted plane 34.

The expansion anchor 10 is an undercut metal anchor.

Figure 2:
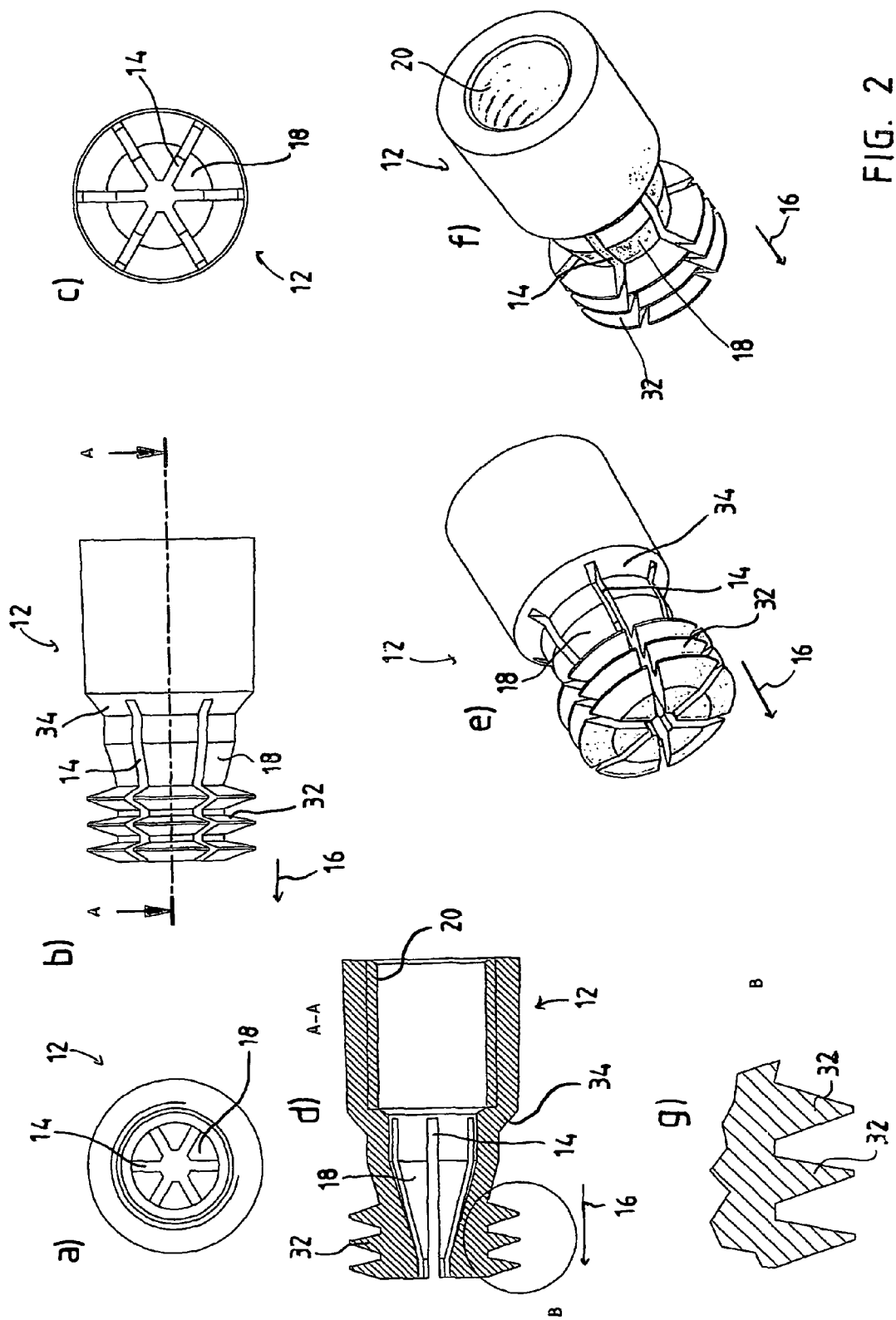

In FIG. 2, the expansion sleeve 12 of the expansion anchor 10 according to the invention is shown in the views indicated above.

The expansion sleeve 12 is divided into expansion tongues 18 by means of longitudinal slits 14 that are disposed in the front region of the expansion sleeve 12, in the setting direction 16.

The expansion sleeve 12 has an inside thread 20 in the rear region, in the setting direction 16, and can be expanded by means of a screw 24 that is configured, in the rear region, with an outside thread 30 that matches the inside thread 20 of the expansion sleeve 12, and is screwed into the expansion sleeve 12 to act on the expansion body 22.

The expansion tongues 18 have three cutting edges 32 disposed one behind the other on the outside of their free ends, and are configured in such a manner that these pivot out during expansion, in such a manner that the cutting edges 32 cut into the wall of the bore in the anchoring base, not shown here, and then form an undercut in the bore in this region.

The transition between the region of the expansion sleeve 12 not divided into expansion tongues 18 and the expansion tongue 18 is configured in one step for forming a planned bending point, whereby the incline is structured in the form of a slanted plane 34.

FIG. 3 shows expansion body 22 of the expansion anchor 10 according to the invention in different views. The expansion body 22 is configured in the form of a truncated cone that narrows conically in the setting direction 16. This body consists of steel.

FIG. 4, finally, shows a screw 24 for expanding the expansion anchor 10 according to the invention in different views.

The screw 24 comprises a screw shaft 26 and a screw head 28. The screw shaft 26 is configured without a thread in the front region, in the setting direction 16, and with an outside thread 30 that matches the inside thread 20 of the expansion sleeve 12 in the rear region. The thread-free part of the screw shaft 26 is smaller in diameter than the part of the screw shaft 26 that is provided with the outside thread 30.

The length of the screw 24, i.e. of the screw shaft 26, is predetermined in defined manner and adapted to the expansion sleeve 12 that is used and to the expansion body 22 that is disposed in the expansion sleeve 12.

REFERENCE SYMBOL LIST (is part of the specification)
10 expansion anchor
12 expansion sleeve
14 longitudinal slits
16 setting direction
18 expansion tongues
20 inside thread
22 expansion body
24 screw
26 screw shaft
28 screw head
30 outside thread
32 cutting edge
34 slanted plane

The invention claimed is:

1. Expansion anchor composed of an expansion sleeve that has a longitudinal axis, that is divided into expansion tongues via longitudinal slits that are disposed in the front region of the expansion sleeve, in the setting direction, and that has an inside thread in the rear region, in the setting direction, and of an expansion body, which is disposed within the expansion sleeve in the front region of the expansion sleeve, in the setting direction, wherein the transition between the region of the expansion sleeve that is not divided into expansion tongues and the expansion tongues comprises a slanted plane, wherein each expansion tongue has a respective free end and has a respective plurality of cutting edges arranged one behind the other in the setting direction on an outside of the respective free end, and wherein the expansion tongues in a region adjoining a respective first cutting edge of the plurality of cutting edges extend at an inward angle from both the slanted plane and the longitudinal axis.

2. Expansion anchor according to claim 1, wherein this anchor can be inserted into a predetermined bore of an anchoring base.

3. Expansion anchor according to claim 1, wherein the expansion sleeve has an opening such that the expansion sleeve can be expanded via a screw composed of screw shaft and screw head in such a manner that when this screw is screwed into the opening of the expansion sleeve and subsequently tightened, the expansion body is pressed forward, in the setting direction, so that the expansion sleeve expands.

4. Expansion anchor according to claim 3, wherein the length of the opening of the expansion sleeve is predetermined in defined manner.

5. Expansion anchor according to claim 1, wherein the expansion body consists of plastic or metal.

6. Expansion anchor according to claim 1, wherein the expansion tongues are configured in such a manner that when the expansion body is pressed into the expansion sleeve, they are expanded outward, and when the expansion body is pressed further in, they first pivot out in accordance with the conicity of the expansion body to such an extent that the cutting edges cut into the wall of the bore in the anchoring base and then form an undercut in the bore in this region.

7. Expansion anchor according to claim 1, wherein the expansion anchor is a metal expansion anchor.

8. Expansion anchor according to claim 1, wherein the expansion anchor can be set into concrete and steel-reinforced concrete components.

9. A combination comprising:

an expansion anchor composed of:

an expansion sleeve:

having a longitudinal axis, divided into expansion tongues via longitudinal slits that are disposed in the front region of the expansion sleeve, in the setting direction, each expansion tongue having a respective free end and a respective plurality of cutting edges arranged one behind the other in the setting direction on an outside of the respective free end, having an inside thread in the rear region, in the setting direction, having an opening, and having a transition between the expansion tongues and a region of the expansion sleeve that is not divided into expansion tongues, the transition comprising a slanted plane, and the expansion tongues in a region adjoining a respective first cutting edge of the plurality of cutting edges extending at an inward angle from both the slanted plane and the longitudinal axis, and an expansion body disposed within the expansion sleeve in the front region of the expansion sleeve, in the setting direction; and a screw composed of a screw shaft and a screw head and without a thread in the front region of the screw shaft, in the setting direction, and with an outside thread that matches the inside thread of the expansion sleeve in the rear region, in such a manner that when the screw is screwed into the opening of the expansion sleeve and subsequently tightened, the expansion body is pressed forward, in the setting direction, so that the expansion sleeve expands;

wherein the thread-free part of the screw shaft is smaller in diameter than the part of the screw shaft provided with the outside thread; and wherein the screw is separable from the expansion body.

* * * * *